July 22, 1969  C. F. HAUTAU  3,456,557
MACHINE TOOL
Filed March 6, 1967  4 Sheets-Sheet 1
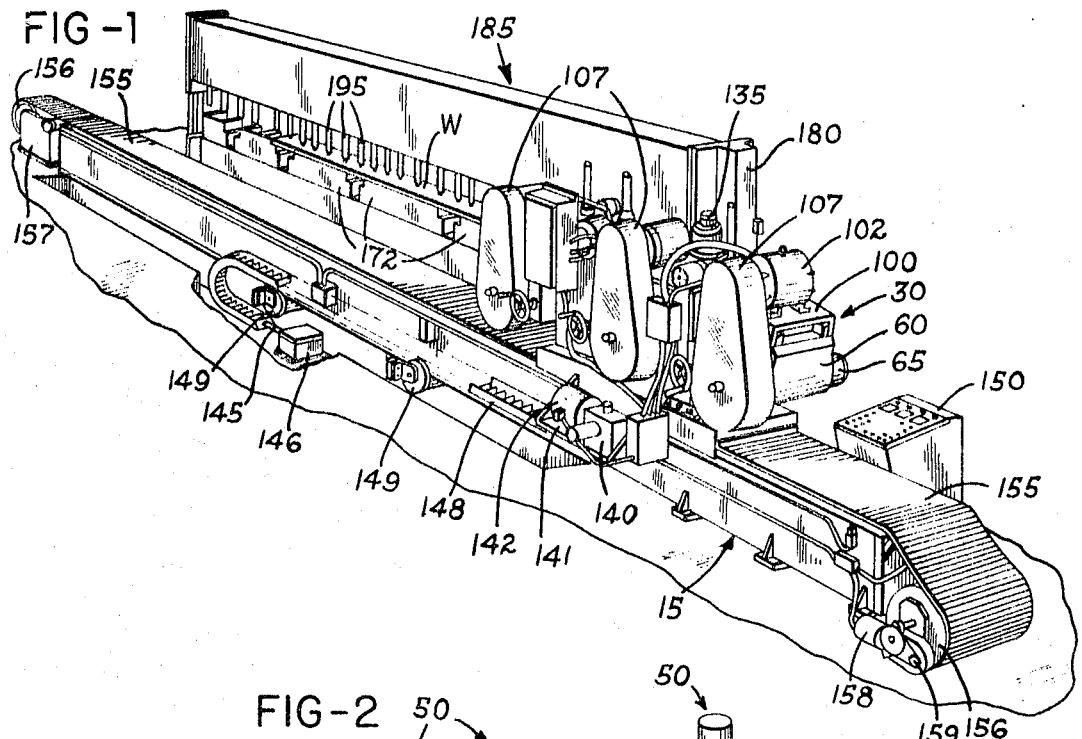
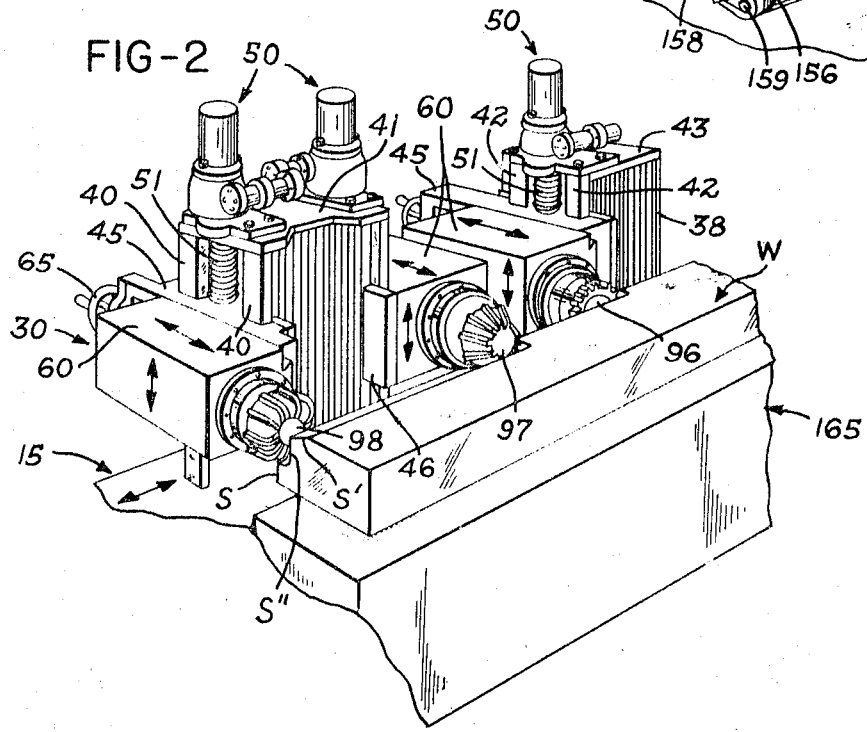
INVENTOR.
CHARLES F. HAUTAU
BY
*Marechal, Biebel, French & Bugg*
ATTORNEYS

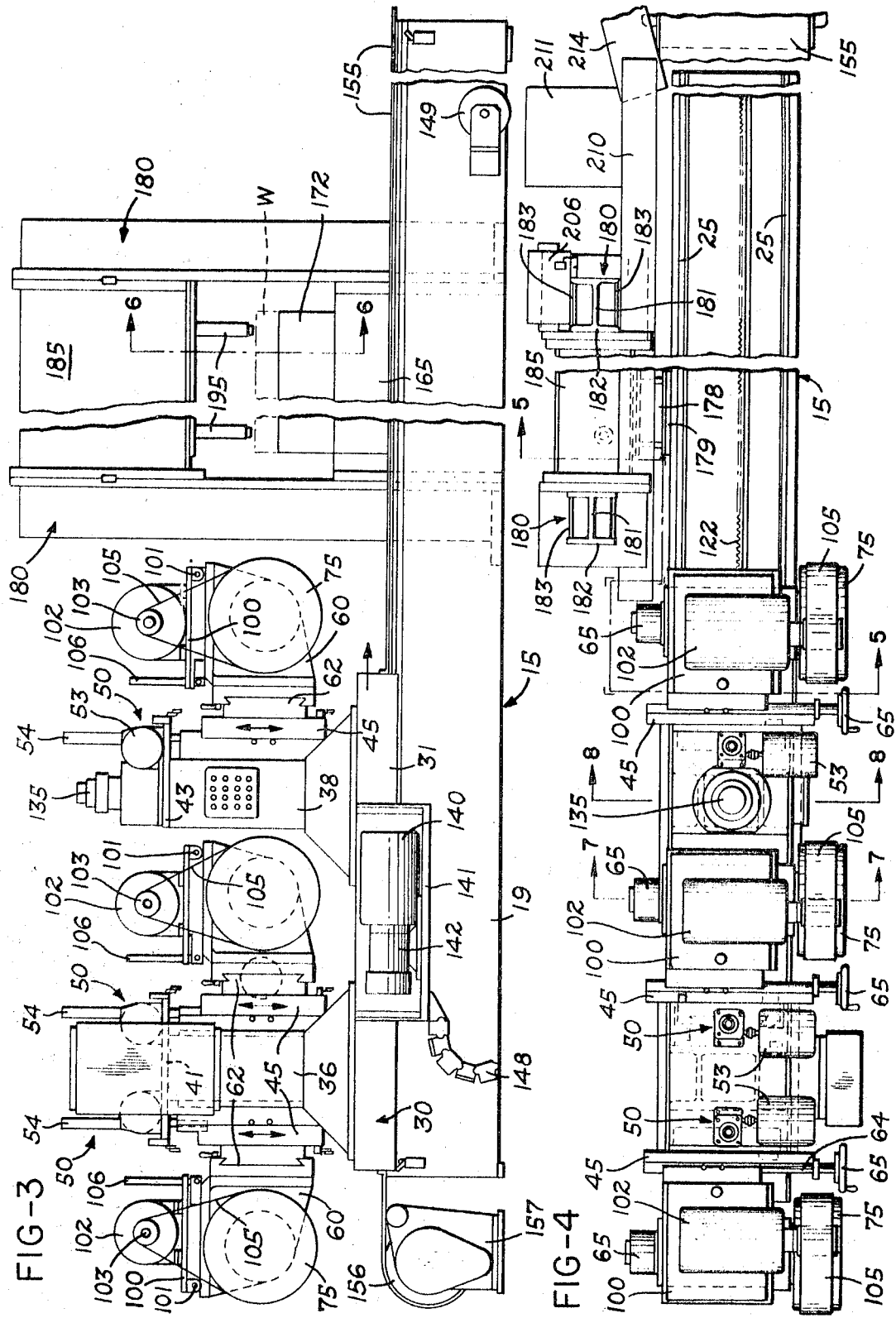

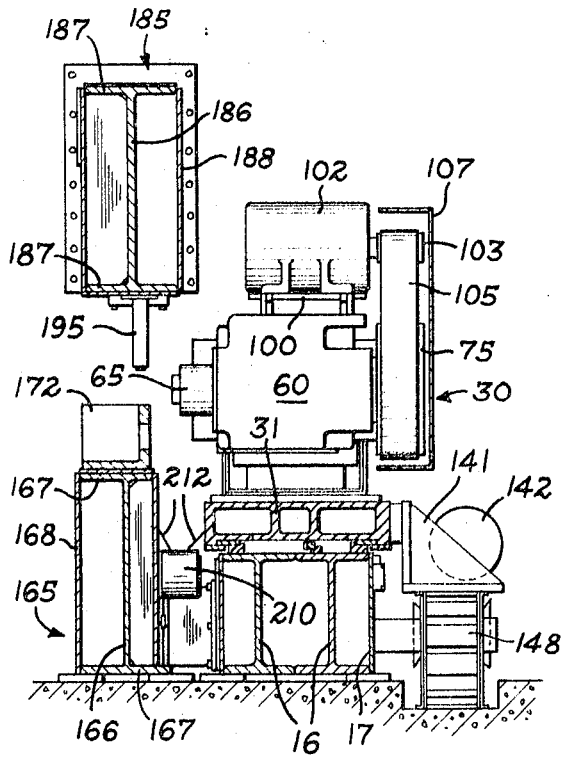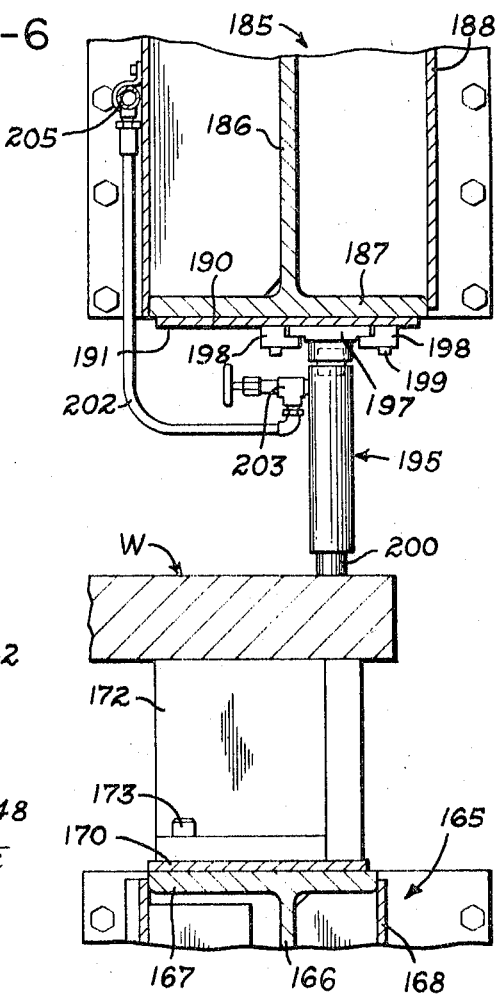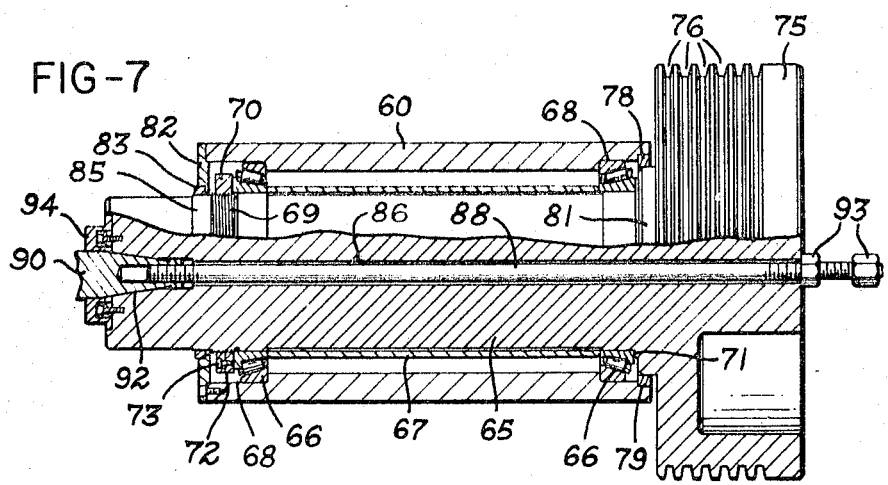

July 22, 1969 C. F. HAUTAU 3,456,557
MACHINE TOOL
Filed March 6, 1967 4 Sheets-Sheet 4
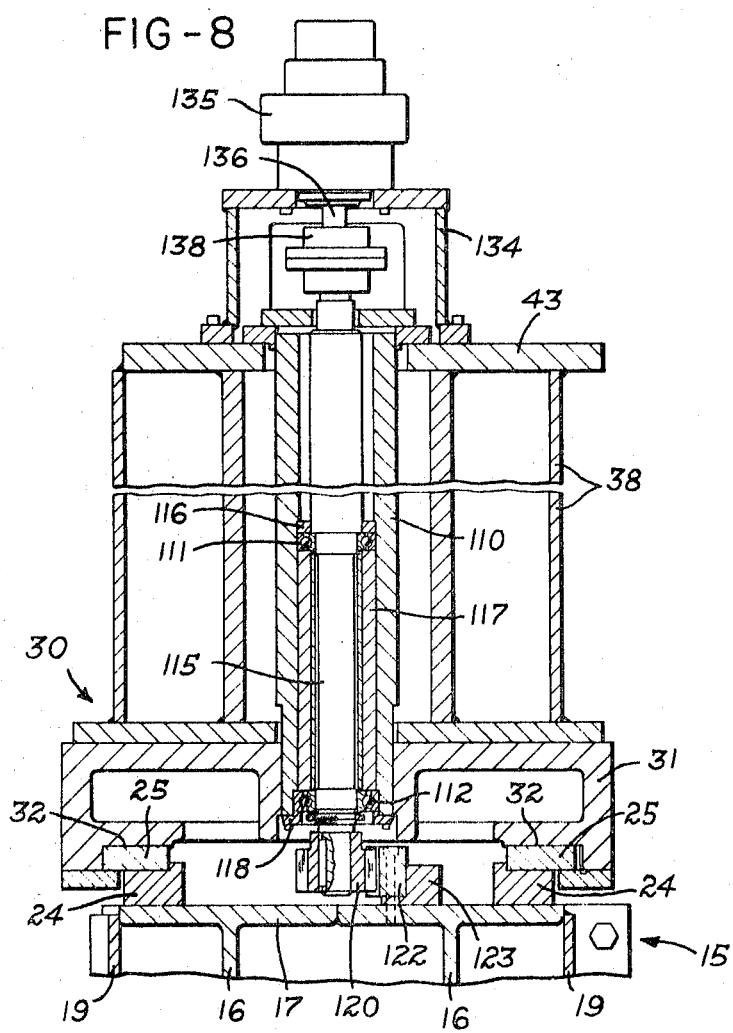
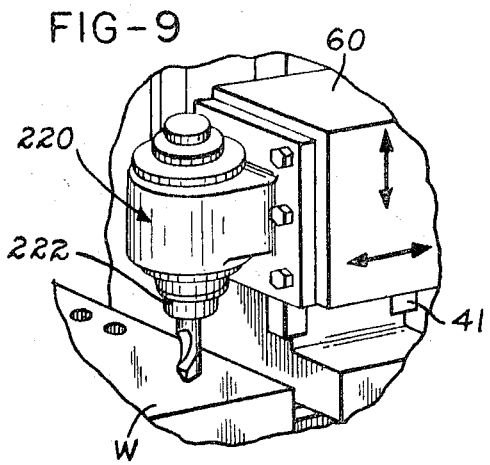
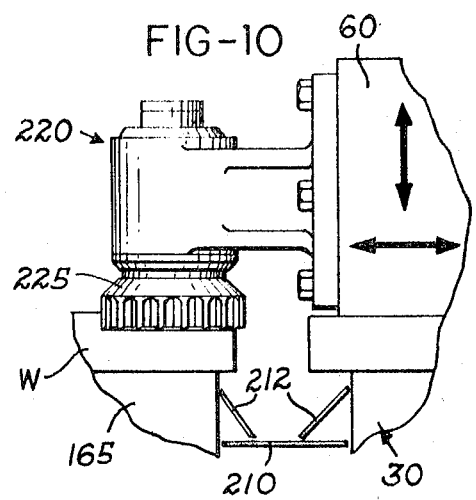

United States Patent Office 3,456,557
Patented July 22, 1969

3,456,557
MACHINE TOOL
Charles F. Hautau, Oxford, Ohio, assignor to The Black Clawson Company, Hamilton, Ohio, a corporation of Ohio
Filed Mar. 6, 1967, Ser. No. 620,999
Int. Cl. B23c 1/04; B23b 43/00
U.S. Cl. 90—15                                    8 Claims

ABSTRACT OF THE DISCLOSURE

A column mill having an elongated bed with an adjacent stationary table and overhead bridge supporting hydraulic rams for clamping a large and heavy workpiece to the table, a power driven carriage mounted on the bed and including a plurality of independently adjustable housings spaced longitudinally in relation to the bed, and each housing supporting a motor driven spindle having a rotary cutter for simultaneously forming multiple surfaces on the workpiece during one pass of the carriage.

BACKGROUND OF THE INVENTION

In the fabrication of large steel plates of substantial thickness such as used in the construction of structural columns for a building or in constructing a ships hull, it is common to join elongated thick steel strips by welding their longitudinal edges together. Prior to the welding operation, however, it is desirable to face and scarf both longitudinal edges of each strip by forming a flat abutting surface, a J-shaped relief surface and a beveled surface on each edge so that when the longitudinal edges of a pair of strips are abutted, the relief and beveled surfaces cooperate to form a cavity which enables the entire edges of the strips to be effectively welded.

The facing and scarfing of the longitudinal edges of relatively light steel strips can be performed by clamping each strip onto a reciprocable table of a horizontal mill or planer. A pass is made across each edge of the strip with a facing cutter which is then replaced by a scarfing cutter after which a second pass is made across each edge to form the J-shaped surface. The first scarfing cutter is replaced with a second scarfing cutter, and then another pass is made along each edge to form the beveled surface. The multiple passes and the interchangement of cutters result in requiring substantial time in preparing each strip for joining or welding to another strip.

In the preparation of larger steel strips, as for example, a strip 40 feet in length, 5 inches in thickness and 18 inches or more in width, a milling or planer machine with a reciprocating table is impractical. That is, the bed which supports the table must be at least twice the length of the table, which require substantial floor space, and it is extremely difficult to clamp the strip to the table with sufficient force to hold the strip flat without adding substantial weight to the table in addition to the weight of the steel strip and without bowing the table. Moreover, it is inconvenient to load large strips on the table, and it is difficult to transfer from the moving table the enormous amount of chips produced by the milling or planning operations.

Thus usually the facing and scarfing of the large strips is performed with gas torches. This procedure, however, is not only slow and very expensive due to the high consumption of gas, but also produces relatively rough surfaces. Furthermore, with some high tensile steels, the heat produced by the torches results in an undesirable change in the metallurgical properties of the steel.

SUMMARY OF THE INVENTION

The present invention is directed to an improved and efficient machine tool which substantially reduces the cost and time required for facing and scarfing the longitudinal edges of large heavy steel strips and performs these operations with extremely high accuracy. The machine tool provides for clamping the strip or workpiece to a stationary table with the substantial force which is necessary to hold the workpiece flat, and provides for continuously disposing of the chips as they are produced.

In accordance with a preferred embodiment of the invention, these primary features are provided by a machine tool which incorporates an elongated stationary table constructed from an I-beam and which is capable of supporting a steel strip of substantial length. An I-beam bridge is spaced above the table and supports a series of hydraulic rams which are capable of clamping the strip to the table with substantial force so that the strip is held flat. An elongated bed extends parallel to the table in adjacent relationship and supports a carriage on which are mounted three spindle support housings spaced longitudinally in relation to the bed.

Each housing is adjustable both vertically and horizontally and rotatably supports a large diameter horizontal spindle which incorporates an integral flywheel. Each spindle is separately driven through a belt drive connecting the flywheel directly to a motor supported and carried by the corresponding spindle housing. This spindle construction and drive arrangement substantially eliminates the vibration of the spindle and thereby eliminates chatter between the cutter mounted on the spindle and the strip or workpiece.

The carriage is driven by a variable speed hydrostatic drive which provides substantial torque for its weight and size and the carriage is moved along the bed so that the several rotary cutters simultaneously face and scarf multiple surfaces on an edge of the strip during one pass of the carriage along the length of the strip. As a result, the machine tool of the invention is capable of preparing the steel strips for welding in a significantly shorter time than heretofore required and with substantially greater accuracy so that the strips can be accurately welded and the overall time required to fabricate a steel plate is substantially reduced.

It is to be understood, however, that a machine tool constructed in accordance with the invention is not limited to facing and scarfing the edges of a steel strip but may be used for efficiently forming any predetermined surface on a workpiece which has substantial weight and/or size. Furthermore, the machine tool is suited for numerical tape control when it is desirable to form a predetermined contoured surface on a single workpiece or on a stack of workpieces. For example, the tool could be operated under tape control for forming identical curved surfaces on a plurality of steel sheets which are used in fabricating a large curved object, as for example, a spherical water storage tank.

Brief description of the drawings

FIG. 1 is a perspective view of a machine tool constructed in accordance with the invention;

FIG. 2 is a fragmentary schematic perspective view of a machine tool of the invention and illustrates its use for facing and scarfing the edge of a large steel strip;

FIG. 3 is an elevational view of the tool shown in FIG. 1 with portions broken away;

FIG. 4 is a plan view of the tool shown in FIG. 3 with portions broken away;

FIG. 5 is a section taken generally on the line 5—5 of FIG. 4;

FIG. 6 is a fragmentary section taken generally on the line 6—6 of FIG. 3;

FIG. 7 is a partial section of a spindle and its supporting housing taken generally on the line 7—7 of FIG. 4;

FIG. 8 is a section taken generally on the line 8—8 of FIG. 3;

FIG. 9 is a schematic perspective view of a drilling head attachment for use on the tool shown in FIGS. 1–4; and FIG. 10 is an elevational view of a planer head attachment.

Description of preferred embodiments

FIGS. 1–4 show a milling machine constructed in accordance with the invention and including an elongated bed 15 which is formed by a pair of adjacent I-beams 16 (FIG. 5) having upper and lower flanges 17 connected by side plates 19 to form a bed having a rectangular box-like cross-section. A pair of parallel spaced longitudinally extending rails 24 are mounted on the upper surface of the bed 15, and each rail supports a guide or way plate 25 which extends the full length of the bed 15 as indicated in FIG. 4.

A carriage 30 is slidably supported by the way plates 25 and includes a saddle type base 31 (FIG. 8) on which are formed coplanar flat bottom surfaces 32 which slidably engage the way plates 25. The base 31 is retained on the way plates 25 by saddle clamping plates 34 which extend partly under the bottom surface of the way plates. The carriage 30 includes two upright columns 36 and 38 (FIG. 3) which are fabricated from steel plates and are rigidly secured to the base 31. The column 36 includes a pair of vertically extending way plates 40 (FIG. 2) on each of two opposite sides and has an upper horizontal support plate 41. Similarly, the column 38 includes a pair of vertically extending way plates 42 on one side and is provided with an upper support plate 43.

A saddle 45 is slidably mounted on each pair of way plates 40 and 42 and is retained thereon by corresponding saddle clamping plates 46 (FIG. 2). The saddles 45 are moved vertically on their way plates by corresponding ball screw jacks 50 (FIGS. 2 and 3) which are mounted on the upper support plates 41 and 43. Each jack 50 includes a vertically extending stationary screw (not shown) which connects with the corresponding saddle 45 and is surrounded by a collapsible protective cover 51 (FIG. 2). A rotatable sleeve (not shown) surrounds each screw and is rotated by a worm which is driven by a reversible electric motor 53 (FIG. 4). When the saddle 45 is elevated, the stationary screw extends upwardly into the tubular housing portion 54 of the jack.

A spindle housing 60 (FIG. 3) is slidably mounted on each of the saddles 45 by an interfitting dove-tail connection 62 formed on the housing base 63 and on the corresponding saddle 45. Each housing 60 is adjusted horizontally by a cross feed screw 64 (FIG. 4) rotatably supported by the corresponding saddle 45 and threadably engaging the housing 60. Each screw is operated manually by a corresponding hand wheel, but the screws may be power operated by reversing motors connected to the screws.

A large diameter spindle 65 (FIG. 7) is rotatably supported within each housing 60 by a pair of anti-friction bearings 66 having inner races mounted on the spindle on opposite ends of a sleeve 67 and having outer races seated within corresponding counterbores 68 formed within the housing. External threads 69 are formed on the outer surface of each spindle 65 and are engaged by a retaining ring 70 which clamps the inner races of the bearings and sleeve 67 against an annular external shoulder 71 formed on the spindle 65. The ring 70 has an arcuate split portion 72 which is connected by a screw 73 for locking the ring after it has been tightened on the spindle.

A flywheel 75 is formed as an integral part of each spindle 65 and includes a series of circumferential V-grooves 76 to form a pulley. An annular seal 78 is mounted within a counterbore 79 formed within the end of the housing 60 and engages a cylindrical surface 81 formed on the spindle adjacent the flywheel 75. An annular plate 82 is secured to the opposite end of each housing 60 and supports an annular seal 83 which engages a cylindrical surface 85 formed on the spindle.

An axially extending hole 86 is formed within the center of each spindle 65 and receives a bolt 88 which is threadably connected on one end to a collet 90 having a tapered surface which mates with a corresponding tapered surface 92 formed within the end portion of the spindle 65 opposite the flywheel 75. The opposite end of the bolt is threaded for receiving a pair of nuts 93. Diametrically extending keys 94 are mounted on the end face 95 of each spindle 65 and are adapted to interlock with a rotary milling cutter which is retained by the collet 90 and bolt 88. As illustrated in FIG. 2, the first spindle 65 supports a facing type cutter 96 while the second spindle supports a tapered cutter 97 and the third spindle supports a ball or radius type cutter 98.

Referring to FIG. 3, a support plate 100 is pivotally connected to the top of each spindle housing 60 by a shaft 101 and supports an electric motor 102. A pulley 103 is mounted on the shaft of each motor 102 and is connected to the flywheel 75 of the corresponding spindle 65 by a poly V-belt 105. The tension of each belt 105 is adjusted by pivoting the plate 100 and adjustably securing it to a support rod 106 pivotally connected to the spindle housing 60. A protective cover 107 (FIG. 5) is mounted on each housing 60 for covering the belt drive.

Referring to FIG. 8, a tube 110 extends vertically through the column 38 of the carriage 30 and supports upper and lower anti-friction bearings 111 and 112 respectively, which rotatably support a vertically extending drive shaft 115. The outer race of the upper bearing 111 seats against a ring 116 and is retained by a sleeve 117 extending from the lower bearing 112 which is retained by a ring 118 secured to the lower end of the tube 110. A pinion 120 is mounted on the lower end portion of the shaft 115 and engages an elongated rack 122 which extends the full length of the bed 15 (FIG. 4) and is supported by a rail 123 secured to the upper surface of the bed.

A frame 134 (FIG. 8) is mounted on the upper support plate 43 of the column 38 and supports a hydraulic motor 135 having an output shaft 136 which is connected to the drive shaft 115 by a flexible drive coupling 138. The motor 135 is supplied with hydraulic fluid from a variable volume hydraulic pump 140 (FIG. 3) which is supported by a frame 141 secured to the side of the base 31 of the carriage 30 as shown in FIGS. 3 and 5. An electric motor 142 is also mounted on the frame 141 for driving the pump 140. Thus by varying or reversing the output flow of the hydraulic pump 140, the travel of the carriage 30 along the way plates 25 mounted on the bed 15 is precisely controlled.

Electrical power supply and control cables 145 (FIG. 1) are connected to the carriage 30 and extend from a junction box 146 through an articulated supporting track 148 having one end connected to the frame 141. A series of rollers 149 are spaced at intervals along the bed 15 and are adapted to engage and support the track 148 as the carriage moves along the bed. The power supply and control cables 145 are connected to a main control console 150 which is shown in FIG. 1 adjacent the bed 15 but is intended to be located at a convenient location.

Referring to FIG. 1, a pair of generally flat articulated metal covers 155 are connected to opposite ends of the base 31 of the carriage 30 and are supported by the guideway plates 25. The covers 155 are coiled upon corresponding drums 156 which are rotatably supported at opposite ends of the bed 15 by frames 157 and are each driven by a reversible electric motor 158 through a gear reduction unit 159. The covers 155 protect the way plate 25 and rack 122.

Referring to FIGS. 1 and 3–5, an elongated table 165 extends adjacent the bed 15 and includes an I-beam 166 (FIG. 5) which has upper and lower flanges 167 connected by side plates 168 to form a box-like cross-section. An elongated flat plate 170 (FIG. 6) is mounted on the upper flange 167 and forms an elongated flat surface for supporting a series of table members 172 (FIGS. 1 and 6) which are secured to the upper flange 167 by a series of screws 173. The table members 172 have a coplanar flat upper surface 174 for supporting a workpiece W illustrated in FIGS. 1 and 6 as a heavy steel strip having a thickness of several inches.

As illustrated in FIGS. 4 and 5, the table 165 is connected to the bed 15 by a series of longitudinally spaced members 178 having parallel spaced flanges 179 which are secured to the adjacent side plate 19 of the bed 15 and the adjacent side plate 168 of the table 165. As shown in FIG. 3, a vertically extending column 180 is connected to each end of the table 165, and each column includes an H-beam 181 (FIG. 4) having flanges 182 which are connected by corresponding side plates 183.

An elongated bridge 185 (FIGS. 3 and 5) is connected to the upper end portions of the columns 180 and extends in parallel spaced relation above the table 165. The bridge 185 includes an I-beam 186 having upper and lower flanges 187 which are connected by side plates 188 to form a box-like cross-section similar to that of the table. Referring to FIG. 6, an elongated plate 190 is secured to the bottom surface of the lower flange 187 and provides a flat lower surface 191 which extends the full length of the bridge 185.

A series of longitudinally spaced hydraulic cylinders 195 are suspended from the bridge 185. Each cylinder 195 includes a head 197 which is clamped to the surface 191 by a pair of brackets 198 secured to the lower flange 187 by screws 199. Each cylinder 195 also includes a ram 200 which is adapted to engage the upper surface of a workpiece when hydraulic fluid is supplied to the cylinder 195 through a conduit 202 and a valve 203. Hydraulic fluid is supplied to each of the conduits 202 through a manifold 205 (FIG. 6) connected to a hydraulic motor driven pump 206 (FIG. 4) which is mounted on the upper portion of one of the columns 180. As illustrated in FIG. 1, thirty cylinders 195 are suspended from the bridge 185 and each cylinder has a ten ton capacity which provides for a combined maximum clamping force against the workpiece of 600,000 pounds.

Referring to FIGS. 4 and 5, an endless chain conveyor 210 extends between the bed 15 and the table 165 and is powered by a drive 211. A pair of stationary sloping plates 212 extend longitudinally along the upper reach of the conveyor 210 and form a trough for collecting chips which are produced during the machining operations. The chips are delivered by the conveyor 210 to an auxiliary spur conveyor 214 (FIG. 4) which extends to a suitable tote box.

In operation of the machine tool, the workpiece W is clamped to the table members 72 by energizing the hydraulic cylinders 195. The three spindles 65 which support the corresponding milling cutters 96–98, are adjusted vertically to predetermined settings by energizing the corresponding motors 53 which operate the jacks 48 and are adjusted laterally to predetermined settings by adjusting the corresponding hand wheels 69. The carriage 30 is then moved on the bed 15 by the hydraulic motor 135 so that the carriage traverses along the length of the workpiece. As illustrated in FIG. 2, the cutter 96 faces the edge of the workpiece W and forms a flat face surface S while the cutter 97 forms a beveled surface or scarf S′, and the cutter 98 forms a curved J-shaped surface or J-scarf S″. When the cutter 98 reaches the end of the workpiece, the hydraulic motor 135 is reversed and is rotated at a substantially higher r.p.m. to provide a rapid return of the carriage to its home position.

FIGS. 9 and 10 illustrate other machining operations which can be performed by a machine tool constructed in accordance with the invention. For example, a 90° head 220 may be mounted on one or more of the spindle support housings 60 and provided with a vertically extending spindle 222 which is driven directly through beveled gears by the corresponding spindle 65. Vertical or axial movement of the spindle 222 is controlled by operation of the reversible electric motor 53 for the corresponding jack 50 which raises and lowers the supporting cradle 45.

The head 220 can be used, for example, for vertical drilling, boring and tapping. Similarly, a facing cutter 225 (FIG. 10) may be formed on the vertically extending spindle 222 for forming a flat horizontal surface on the workpiece. It is to be understood that FIGS. 9 and 10 are illustrative of additional operation which can be performed by a machine tool of the invention, and it is apparent that other attachment heads may be mounted on the spindle housing 60 for performing other operations on a workpiece.

From the drawings and the above description, it can be seen that a machine tool constructed in accordance with the invention provides several desirable features and advantages. Basically, the tool is adapted to support and clamp a workpiece of substantial size and weight and efficiently form multiple surfaces on the workpiece. That is, by mounting a plurality of separately driven and separately adjustable horizontal spindles 65 on the carriage 30 and spacing them longitudinally in relation to the direction of travel or traverse of the carriage, multiple surfaces can be simultaneously formed on the workpiece while the carriage makes one pass across the workpiece. As a result, the workpiece can be machined within a substantially shorter period of time than heretofore required, which provides for a significant increase in machining efficiency.

While a carriage having three horizontal spindles 65 is employed in the machine tool shown in the drawings, it is to be understood that two, four or more direct drive spindles may be used without departing from the scope of the invention. The construction of each spindle 65 also provides desirable features. That is, each spindle has a large diameter to avoid bending between the bearings 66 and also includes an integrally formed combination flywheel and pulley 75 to avoid vibration of the spindle and thereby provide chatter-free cutting and a substantial increase in the cutter life.

Another important feature of the invention is provided by the construction of the table 165 and the overhead bridge 185 which supports the series of suspended hydraulic cylinders 195. That is, by incorporating I-beams within the table and bridge and connecting the I-beams with side plates, the table and bridge each have high-strength box-like cross-section so that the workpiece can be clamped to the table with substantial force to hold the workpiece flat. With workpieces which do not extend the full length of the table 165, the hydraulic cylinders 195 which are not employed for clamping are simply shut off by closing the valves 203.

The arrangement of the chip conveyor 210 provides another important feature. By extending the conveyor between the bed 15 and the table 165, the conveyor services the entire machining area and thereby prevents a buildup of chips on the floor.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A machine tool for forming a predetermined surface on the edge of a workpiece of substantial size and weight, comprising an elongated bed having longitudinally extending guideway means, a carriage mounted on said guideway means for longitudinal movement and including a bearing housing, said carriage having means supporting said bearing housing for independent vertical and horizontal movement, a spindle rotatably supported within said housing and having means for supporting a rotary cutter, said spindle including a bearing portion and an integral flywheel having a diameter substantially larger than that of said bearing portion, a drive motor for said spindle, means connected to said bearing housing and supporting said drive motor for movement therewith, a drive means connecting said motor to said flywheel, and variable speed drive means for moving said carriage on said guideway means.

2. A machine tool adapted to mill the edge of a workpiece of substantial size and weight, comprising an elongated bed having longitudinally extending guideway means, an elongated stationary table extending parallel to said bed in horizontally spaced relation and having a surface adapted to support the workpiece, an elongated bridge member extending above said surface of said table in generally parallel spaced relation and having opposite end portions rigidly connected to said table, hydraulically actuated means mounted on said bridge member and adapted to extend downwardly to engage the workpiece for clamping it to said surface with substantial force, a carriage mounted on said guideway means for movement parallel to said table in laterally spaced relation and including a plurality of bearing housings spaced longitudinally relative to said guideway means, said carriage having means supporting each said bearing housing for independent vertical and horizontal movement, a generally horizontally extending spindle rotatably supported within each said housing and having means projecting laterally from said carriage for supporting a rotary cutter adjacent the workpiece supported by said surface, a separate drive motor for each said spindle, means connected to each said bearing housing and supporting the corresponding said drive motor for movement therewith, drive means connecting each said motor with the corresponding said spindle, and drive means for moving said carriage on said guideway means so that said cutters cooperate to form a predetermined surface on the workpiece during a single pass of said carriage relative to the workpiece.

3. A machine tool as defined in claim 2 wherein said hydraulic actuated means include a plurality of hydraulic cylinders each having a downwardly extending ram.

4. A machine tool as defined in claim 2 wherein said table means and said bridge member each include an elongated I-beam having parallel spaced flanges, and plate means connecting said flanges of each said beam to provide a high strength box-like cross-sectional configuration.

5. A machine tool as defined in claim 2 wherein said means on said carriage for supporting each said bearing housing comprises vertically extending guideway means, a platen slidably mounted on said guideway means, power drive means for moving each said platen vertically on said guideway means, horizontally extending guideway means formed on each said platen and slidably supporting the corresponding said bearing housing, and means for adjusting each said housing horizontally on the corresponding said platen to provide horizontal adjustment of the corresponding said spindle.

6. A machine tool as defined in claim 2 wherein said variable speed drive means for moving said carriage comprises a longitudinally extending rack mounted on said bed, a drive shaft rotatably supported by said carriage, a pinion mounted on said drive shaft and engaging said rack, a hydraulic motor mounted on said carriage and connected to rotate said drive shaft, a variable volume hydraulic pump mounted on said carriage for supplying hydraulic fluid to said motor, and electric motor means connected to drive said pump.

7. A machine tool as defined in claim 2 wherein each said spindle includes a bearing portion and an integral flywheel having a diameter substantially larger than that of said bearing portion, and said drive means includes a belt connecting each said flywheel to the corresponding said drive motor.

8. A machine tool as defined in claim 2 including an elongated chip conveyor extending below said table surface between said guideway means mounted on said bed and said table for disposing of the chips produced by said cutters.

References Cited

UNITED STATES PATENTS

| | | | |
|---|---|---|---|
| 534,577 | 2/1895 | Rawle | 90—24 |
| 638,610 | 12/1899 | Thornton | 90—59.1 |
| 1,602,860 | 10/1926 | Sleeper | 90—164 |
| 1,926,997 | 9/1933 | Hoelscher et al. | 29—970 |
| 1,937,408 | 11/1933 | Johnson | 90—15 |
| 2,217,973 | 10/1940 | Snader | 29—970 |
| 2,264,508 | 12/1941 | Carson | 90—59.1 |
| 2,339,800 | 1/1944 | Obecny | 90—59.1 |
| 2,629,920 | 3/1953 | Pridy | 90—59.1 |
| 2,892,389 | 6/1959 | Schurger et al. | 90—15 |
| 3,296,932 | 1/1967 | Pankonin et al. | 90—15 |

FOREIGN PATENTS

| | | |
|---|---|---|
| 772,934 | 4/1957 | Great Britain. |

GERALD A. DOST, Primary Examiner

U.S. Cl. X.R.

29—26